United States Patent
Bhogal et al.

(10) Patent No.: US 7,561,050 B2
(45) Date of Patent: Jul. 14, 2009

(54) SYSTEM AND METHOD TO AUTOMATE PLACEMENT OF RFID REPEATERS

(75) Inventors: Kulvir S. Bhogal, Fort Worth, TX (US); Gregory J. Boss, American Fork, UT (US); Rick A. Hamilton, II, Charlottesville, VA (US); Alexandre Polozoff, Bloomington, IL (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 11/426,972

(22) Filed: Jun. 28, 2006

(65) Prior Publication Data
US 2008/0001758 A1    Jan. 3, 2008

(51) Int. Cl.
*G08B 13/14* (2006.01)
(52) U.S. Cl. .............. 340/572.4; 340/572.7; 343/883; 455/11.1
(58) Field of Classification Search .............. 340/572.1, 340/572.4, 572.7, 10.1, 10.4; 455/7, 11.1; 343/880–883, 890; 700/215
See application file for complete search history.

(56) References Cited

U.S. PATENT DOCUMENTS

| | | | |
|---|---|---|---|
| 6,563,425 B2 | 5/2003 | Nicholson et al. | |
| 6,577,238 B1 | 6/2003 | Whitesmith et al. | |
| 6,669,089 B2 * | 12/2003 | Cybulski et al. | 235/385 |
| 6,724,308 B2 | 4/2004 | Nicholson | |
| 6,784,789 B2 | 8/2004 | Eroglu et al. | |
| 7,155,304 B1 * | 12/2006 | Charych | 700/213 |
| 7,336,167 B2 * | 2/2008 | Olsen et al. | 340/10.1 |
| 2005/0043854 A1 * | 2/2005 | Dunlap, Jr. | 343/878 |

* cited by examiner

*Primary Examiner*—Thomas J Mullen
(74) *Attorney, Agent, or Firm*—Yee & Associates, P.C.; William H. Steinberg; Rudolf O. Siegesmund

(57) ABSTRACT

The Automatic RFID Tuner has one or more RFID repeaters that can travel in the x, y and z axes through a densely packed pallet of goods. The RFID repeater identifies dead spots where RF signals from an RFID transceiver do not penetrate the dense packaging. The RFID repeater calculates a position that ensures the RF signal will reach all passive RFID tags in the dense packaging. The RFID repeater moves to the calculated position so that the RFID transceiver's signal will read all passive RFID tags in the dense packaging.

18 Claims, 5 Drawing Sheets

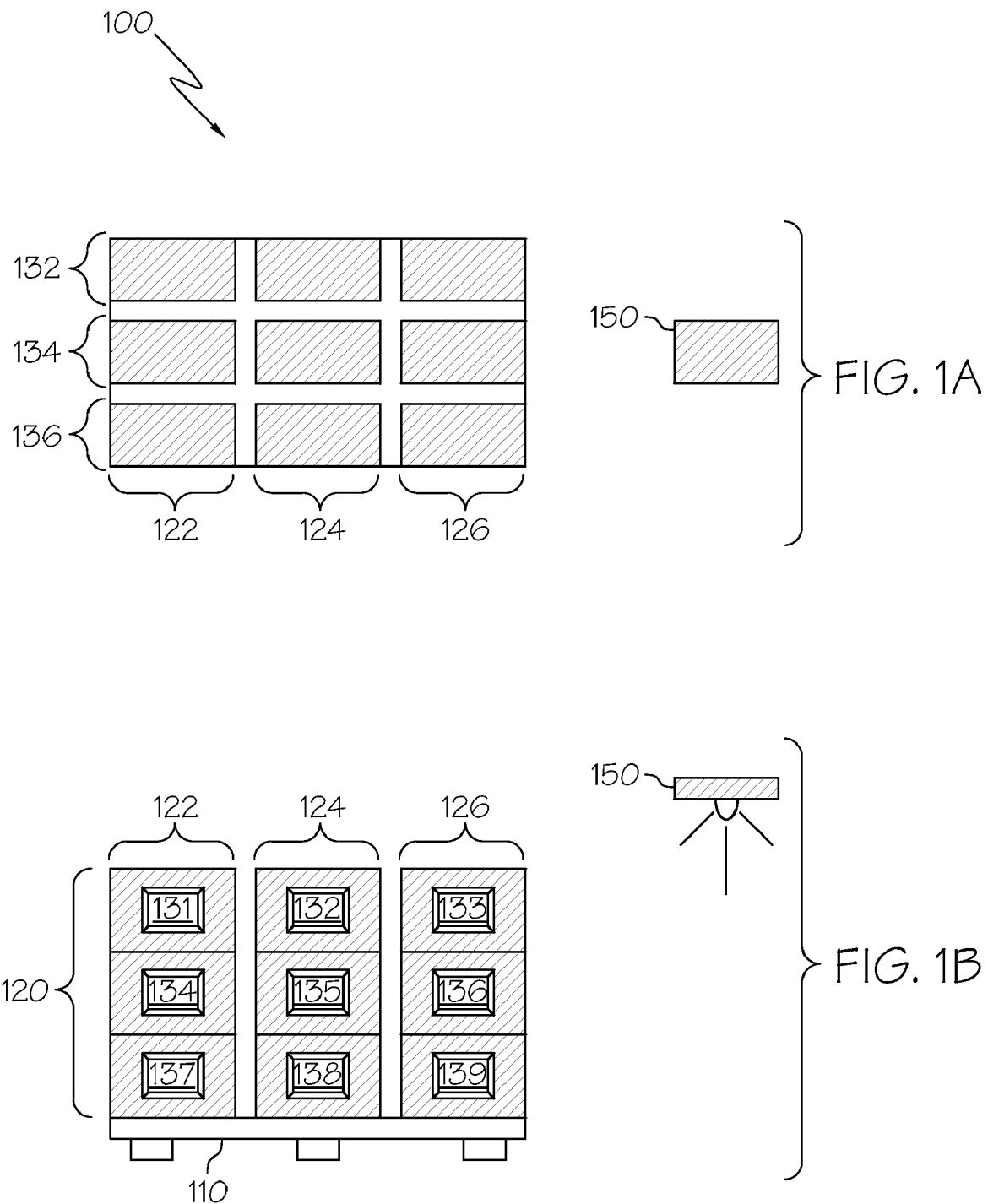

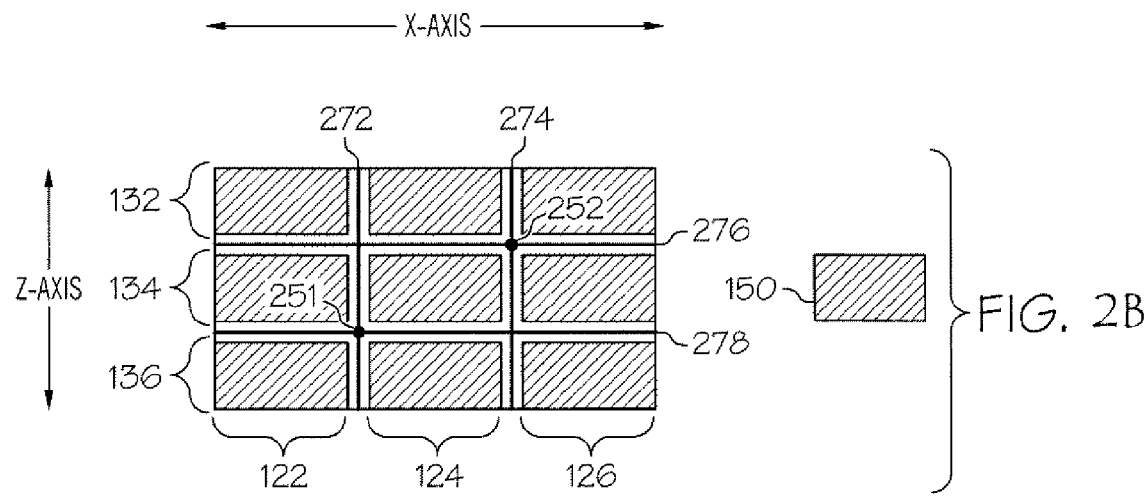
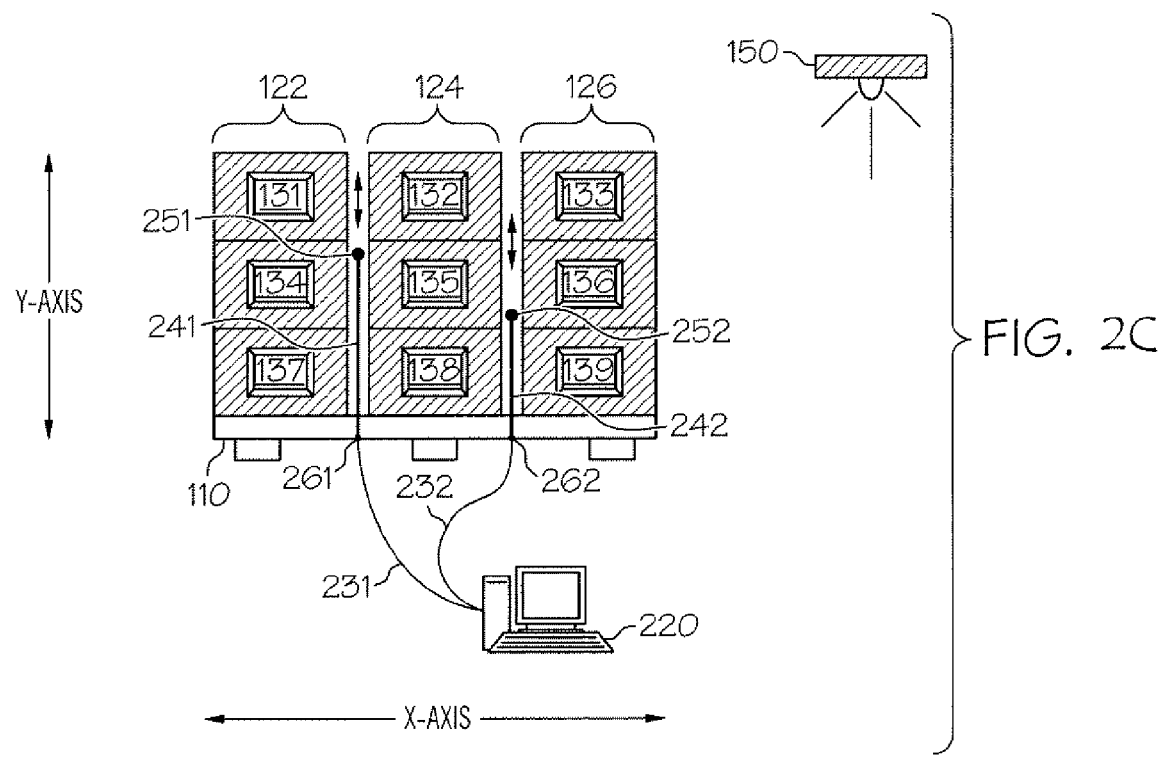

SYSTEM AND METHOD TO AUTOMATE PLACEMENT OF RFID REPEATERS

FIELD OF THE INVENTION

The invention relates generally to the field of electrical communications and relates specifically to querying an information containing device for an immediate reply.

BACKGROUND OF THE INVENTION

Radio Frequency Identification ("RFID") technology comprises two elements: a transponder (hereafter "tag"), which is generally a small, paper thin computer chip with an antenna which stores data, and a transceiver which utilizes a radio signal in the approximate 800-930 Mhz UHF range to read the data from the tag. Active RFID tags contain a power source, such as a battery, and can actively transmit the tag's stored data. Passive RFID tags cannot transmit by themselves, and require a RFID transceiver to provide power via radio signals transmitted by the RFID transceiver. As passive RFID tags pass by a RFID transceiver, the transceiver powers the tag and reads the data stored on the tag.

Large retail companies, such as WAL-MART®, find passive RFID tags advantageous over optical barcodes for inventory tracking. RFID tags have two distinct advantages over traditional optical barcodes: RFID tags can store more information, and RFID tags do not require line-of-sight readings.

A problem in the implementation of passive RFID technology for inventory tracking arises from dead spots. Dead spots can be caused by dense packing of passive RFID tags where inventory materials shield the tags and interrupt signal transmission. For example, in a pallet containing sixty cases of canned goods, where each case has a passive RFID tag, the metal cans in cases around the periphery of the pallet shield the RFID transceiver's signal. Even if the RFID transceiver successfully reads fifty of the sixty RFID tags located on the pallet, the RFID technology failed as a tracking and inventory method because the RFID technology gathered incomplete and inaccurate information.

Dead spots can be avoided by placing passive RFID tags to avoid shielding problems. In addition, RFID repeaters, placed within the packed pallet, can ensure that the RFID transceiver's signal reads all of the passive RFID tags on the pallet. But in order to be sure that all of the passive RFID tags on the pallet are read, the placement of the passive RFID tags and RFID repeaters, if any, must be tested.

One known method for testing the placement of RFID tags uses visual indicators, such as heat-sensitive liquid crystals ("LCDs") that change color when exposed to certain radio frequencies. LCDs that are sensitive to the RF frequency transmitted by an RFID transceiver can act as markers, showing the reach of the RFID signal. Furthermore, an electronic radio frequency receiver or repeater can be placed in various locations within a packed pallet to verify the scanning of passive RFID tags. The electronic radio frequency receiver or repeater may provide a visual readout of signal strength or may store readings in an electronic format that can be read by a computer. Using these known methods, optimal RFID tag and repeater locations may be tested by trial and error.

A need exists for a computer implemented method to automatically determine placement of passive RFID tags or RFID repeaters in a dense packaging storage unit to ensure RFID transceivers can read all the passive RFID tags in the storage unit.

SUMMARY OF THE INVENTION

The invention meeting the need identified above is the "automatic RFID tuner" comprising a plurality of RFID repeaters, each of the RFID repeaters attached to a telescoping mast and connected to a computer, a plurality of tracks, a plurality of motorized carriages adapted for movement along the plurality of tracks and each of the motorized carriages further adapted for transporting one of the telescoping masts. Using the tracks, the motorized carriages, and the telescoping masts, the automatic RFID tuner's RFID repeaters can travel in the x, y and z axes through a dense packaging storage unit to identify dead spots where RF signals from an RFID transceiver do not penetrate the dense packaging storage unit. The RFID tuner's computer calculates a position for each of the RFID repeaters to ensure that the RF signal from the RFID transceiver will reach all passive RFID tags located on packages in the dense packaging storage unit. The automatic RFID tuner moves the RFID repeater to the calculated position so that the RFID transceiver's signal will read all passive RFID tags in the dense packaging storage unit.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIGS. 1A and 1B are two views of an exemplary densely packed pallet of products;

FIGS. 2A, 2B, and 2C shows the automatic RFID tuner for use with the exemplary densely packed pallet of products;

DETAILED DESCRIPTION OF THE PREFERRED EMBODIMENT

Figure 2A:
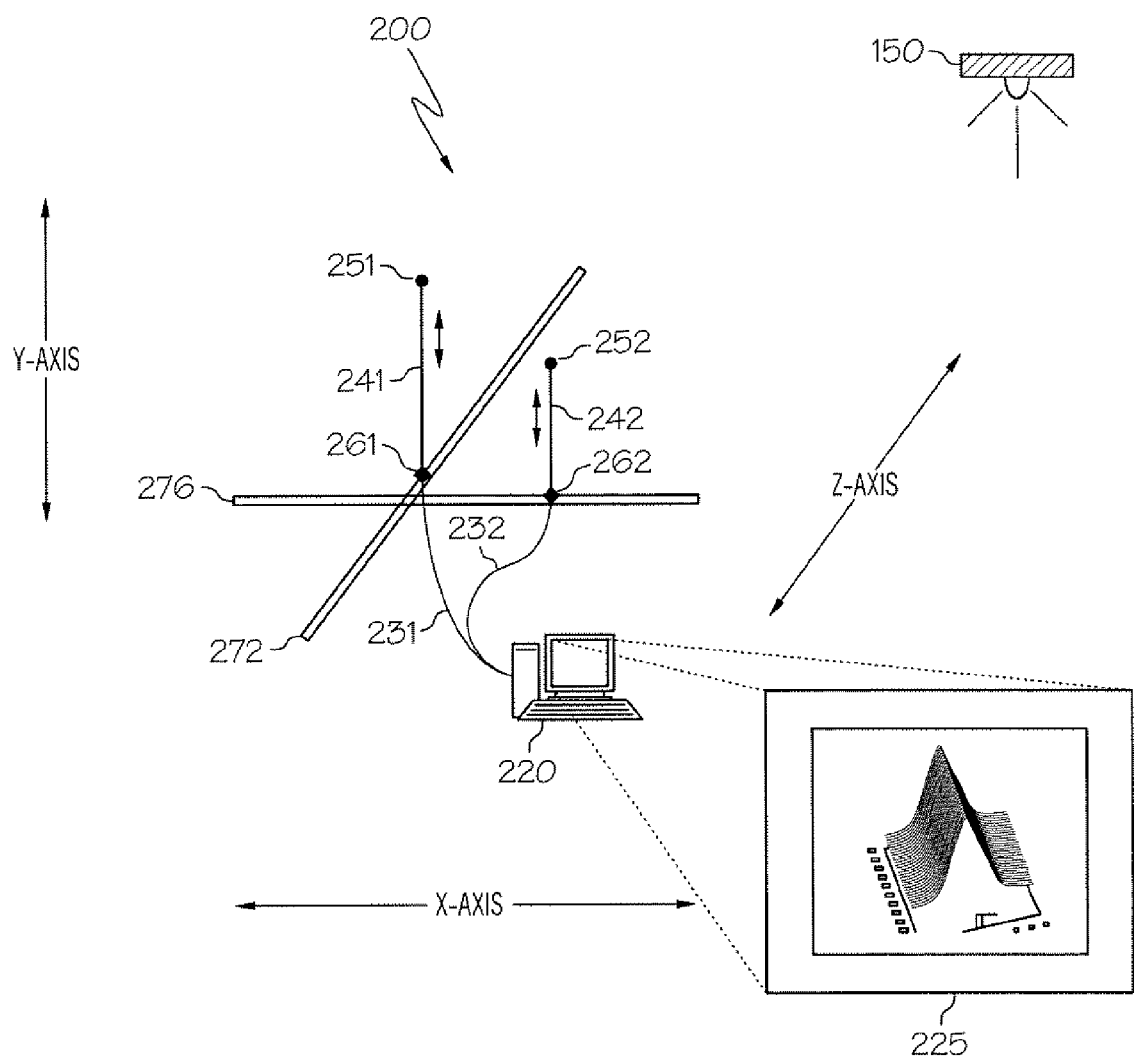

FIG. 1A and FIG. 1B show product pallet 100 representing a densely packed pallet of goods with RFID tags. Product pallet 100 comprises pallet 110 and a plurality of packages 120 in a generally cubical arrangement on the pallet. From the front view (FIG. 1B), plurality of packages 120 are shown stacked vertically (y axis) in first package column 122, second package column 124, and third package column 126. From the top view (FIG. 1A), it is also shown that the first, second and third package columns are also three packages deep (z axis) as well as three packages high (y axis). Accordingly, the plurality of packages can also be described as stacked in fourth package column 132, fifth package column 134, and sixth package column 136 that are each three packages wide (x axis) as well as three packages high (y axis). RFID transceiver 150 locates at a position within transmission range of product pallet 100.

FIG. 2 shows automatic RFID tuner 200 in simplified form with first RFID repeater 251 mounted on first telescoping mast 241 and second RFID repeater 252 mounted on second telescoping mast 242. First telescoping mast 241 and second telescoping mast 242 allow for up and down movement of first RFID repeater 251 and second RFID repeater 252 in the y-axis. First telescoping mast 241 affixes to first motorized carriage 261 and second telescoping mast 242 affixes to second motorized carriage 262. First motorized carriage 261 moves along first track 276 in the x-axis and along second track 272 in the z-axis. Likewise, second motorized carriage 262 moves along first track 276 in the x-axis and along second track 272 in the z-axis. First track 276 and second track 272 interconnect so that the motorized carriages may travel from one track to another. First RFID repeater 251 connects to computer 220 via first cable 231, and second RFID repeater 252 connects to computer 220 via second cable 232. Using first motorized carriage 261 coupled with telescoping mast 241 and second motorized carriage 262 coupled with second telescoping mast 242, automatic RFID tuner 200 can move first RFID repeater 251 and second RFID repeater 252 in the x, y and z axes. Computer screen 225 shows a map of the RF signal strength transmitted from RFID transceiver 150 as measured by RFID repeater 251 and/or RFID repeater 252. Computer 220 may also communicate with RFID transceiver 150. Persons skilled in the art will realize that the number of tracks, motorized carriages, telescoping masts, RFID repeaters, connections, and computers may be varied for automatic RFID tuner 200 as necessary for a particular densely packaged pallet of goods.

FIGS. 2B and 2C depict an embodiment of automatic RFID tuner 200 performing a tuning procedure on product pallet 100 illustrated in FIGS 1A and 1B. First RFID repeater 251 mounts on first telescoping mast 241 and second RFID repeater 252 mounts on second telescoping mast 242 (FIG 2A). First telescoping mast 241 allows movement of first RFID repeater 251 in the [Y]y-axis and second telescoping mast 242 allows movement of second RFID repeater 252 in the [Y]y axis. First telescoping mast 241 affixes to first motorized carriage 261 and second telescoping mast 242 affixes to second motorized carriage 262. As shown in the Top view (FIG 2A) first motorized carriage 261 and second motorized carriage 262 move along first track 272 between first package column 122 and second package column 124 and along second track 274 between second package column 124 and third package column 126 in the z-axis. First motorized carriage 261 and second motorized carriage 262 move along third track 276 between fourth package column 132 and fifth package column 134 and fourth track 278 between fifth package column 134 and sixth package column 136 in the x-axis. First RFID repeater 251 and second RFID repeater 252 connect to computer 220 via first cable 231 and second cable 232. First motorized carriage 261 couples with first telescoping mast 241 and second motorized carriage 262 couples with second telescoping mast 242 to allow first RFID repeater 251 and second RFID repeater 252 to move freely in the x, y and z axes between packages 120 stacked on pallet 110.

There are numerous mechanical methods known in the art for moving RFID repeaters, such as first RFID repeater 251 and second RFID repeater 252, through a dense packaging pallet of goods such as product pallet 100. Ideally, these mechanical means mount to pallet 110. Motorized methods for moving RFID repeaters, such as first RFID repeater 251 and second RFID repeater 252 in the x, y and z axes include, but are not limited to, any combination of telescoping masts, screw, cable, chain or worm drive systems, motorized cars (on or off of a track), and robotic arms. Various pneumatic and hydraulic methods for moving RFID repeaters in the x, y and z axes are also known in the art.

Although computer 220 connects to mechanically mounted RFID repeaters 251 and 252 via cables 231 and 232, any electrical or electronic communication connection may be used, including radio signals or other wireless methods, such as BLUETOOTH.

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the automatic RFID tuner may be carried out by instructions from a computer program residing in a single computer or memory connected to the computer or may be distributed among a plurality of computers and computer programs. The program to implement the automatic RFID tuner is described best, though, as a single computer program that configures and enables one or more general-purpose computers to implement the novel aspects of the RFID tuner. For illustrative purposes, the computer program will be referred to as the "automatic RFID tuner procedure" (see FIG. 5).

Figure 3:
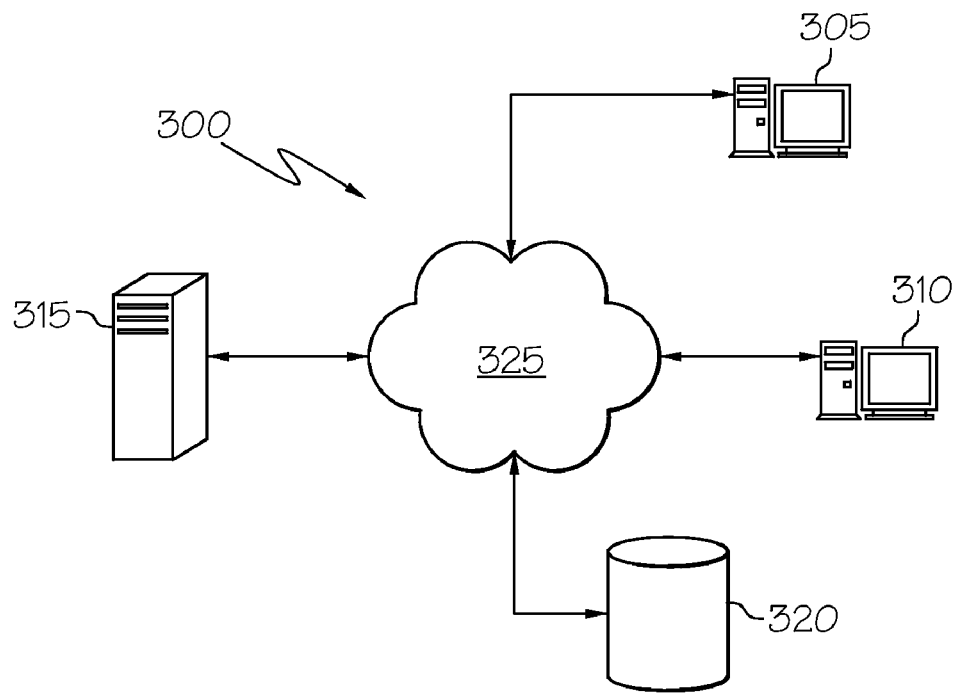
FIG. 3 is an exemplary computer network.

Additionally, the automatic RFID tuner is described below with reference to an exemplary network of hardware devices, as depicted in FIG. 3. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 300 has only a limited number of nodes, including workstation computer 305, workstation computer 310, server computer 315, and persistent storage 320. Network connection 325 comprises all hardware, software, and communications media necessary to enable communication between network nodes 305-320. Unless otherwise indicated in context below, all network nodes use publicly available protocols or messaging services to communicate with each other through network connection 325. Computer 220 (see FIGS. 2A and 2C) may be connected to network 300 through network connection 325.

Figure 4:
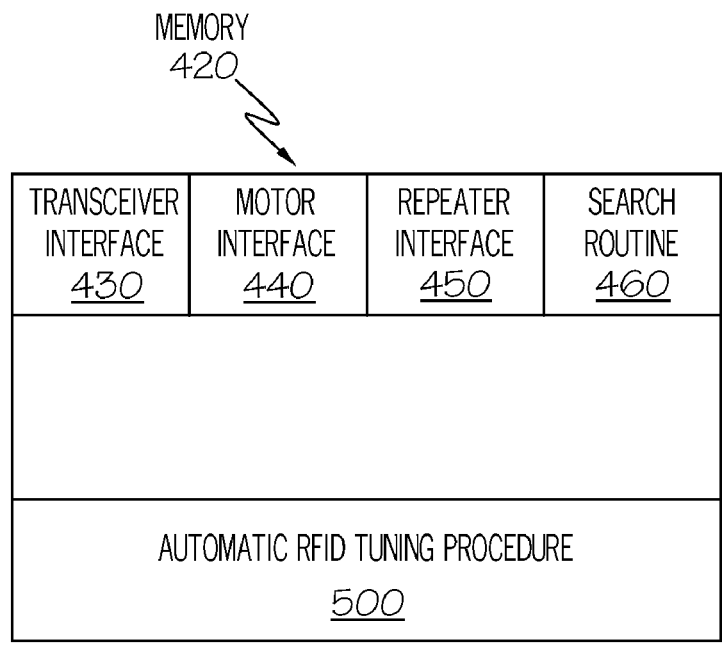
FIG. 4 is a memory containing automatic RFID tuning procedure.

Automatic RFID tuning procedure 500 typically is stored in a memory, represented schematically as memory 420 in FIG. 4. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 4 is included merely as a descriptive expedient and does not necessarily reflect any particular physical embodiment of memory 420. As depicted in FIG. 4, though, memory 420 may include additional data and programs. Of particular import to automatic RFID tuning procedure 500, memory 420 may include transceiver interface 430, motor interface 440, repeater interface 450 and search routine 460 with which automatic RFID tuning procedure 500 interacts. Transceiver interface 430 allows communication between automatic RFID tuning procedure and transceiver 150. Motor interface 440 allows communication between automatic RFID tuning procedure and individual motor carriages. Repeater interface 450 allows communication between automatic RFID tuning procedure and the RFID repeaters. Search routine 460 provides a predefined search pattern for the individual motor carriages.

Figure 5:
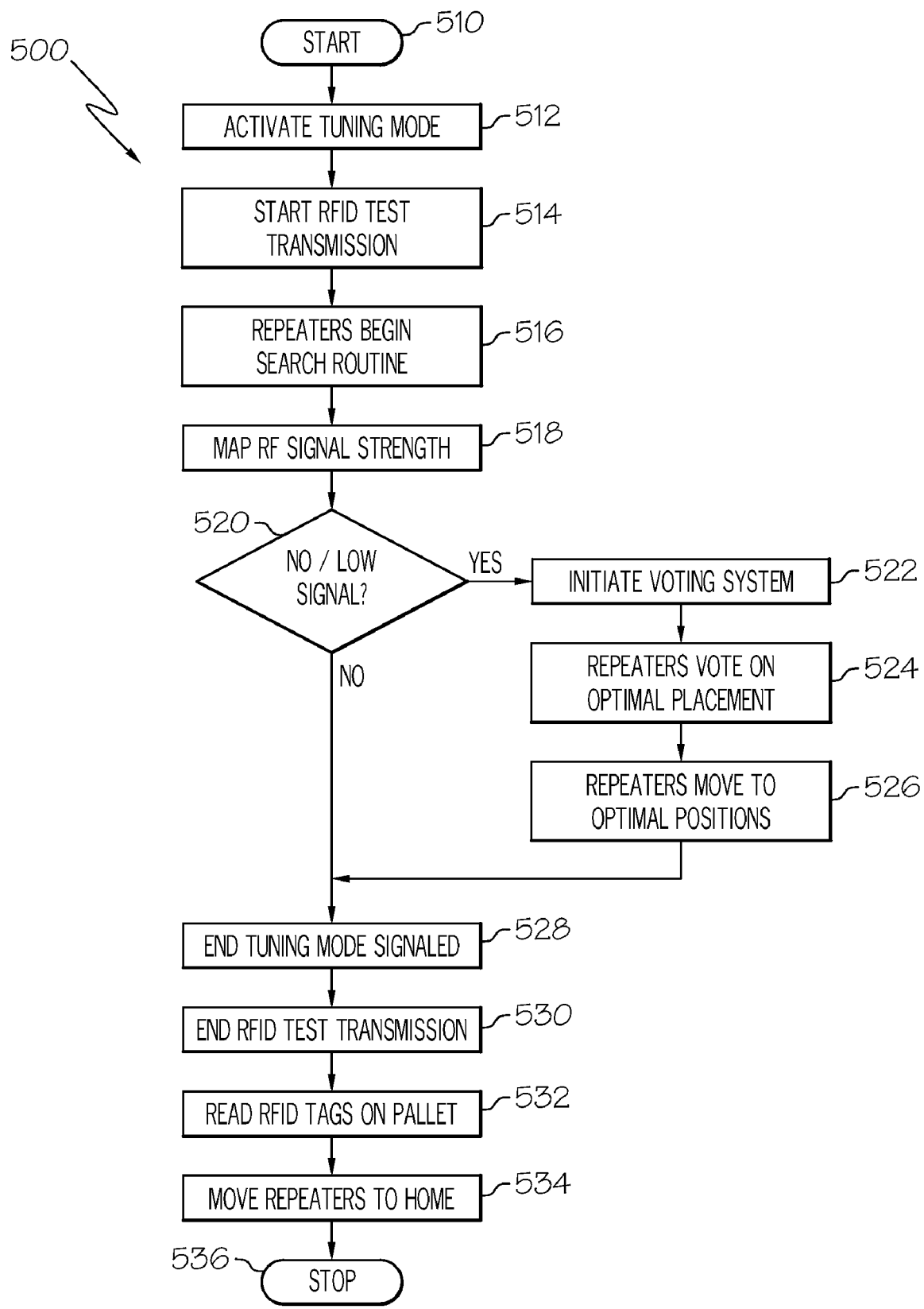
FIG. 5 is a flowchart of the automatic RFID tuning procedure.

As shown in FIG. 5, automatic RFID tuning procedure 500 starts whenever an automatic RFID tuner such as automatic RFID tuner 200 is employed with a densely packed pallet of goods such as pallet 100 in proximity of a RFID transceiver such as RFID transceiver 150 (510). Automatic RFID tuning procedure 500 causes computer 220 to take the following actions. Computer 220 initiates the tuning mode (512) by directing RFID transceiver 150 via transceiver interface 430 to transmit a test signal at a different frequency than used to activate RFID tags such as RFID tags 131-139 of pallet 100 (514). Computer 220 directs mechanically mounted RFID repeaters such as first RFID repeater 251 and second RFID repeater 252 via motor interface 440 to run search routine 460. Motorized RFID Repeaters such as first RFID repeater 251 and second RFID repeater 252 move in the x, y and z axes between packages 120 on product pallet 100 and measure the RF signal strength (516). Computer 220 maps the RF signal strength measured by RFID repeaters such as first RFID repeater 251 and second RFID repeater 252 via repeater interface 450 (518). If automatic RFID tuning procedure 500 identifies areas with dead spots (520), a voting system is initiated (522). Each RFID repeater, such as first RFID repeater 251 and second RFID repeater 252, votes on a location in the x, y and z axes to place itself to eliminate the dead spot (524). Computer 220 calculates positions for each RFID repeater taking into account the relative positions of each RFID repeater such as the position of first RFID repeater 251 relative to the position of second RFID repeater 252. Computer 220 moves each of the RFID repeaters to a specific optimal position as soon as the optimal position for that RFID repeater is identified (526). Once all of the RFID repeaters are placed in optimal positions, or if there are no identified dead spots, an end tuning mode signal is sent to RFID transceiver 150 (528) which ends the test signal transmission (530). RFID transceiver 150 issues the normal signal, reading all passive RFID tags 131-139 on product pallet 100 with the aid of the optimally placed RFID repeaters (532). Once all passive RFID tags 131-139 are read, the RFID repeaters move to a home position (534) and automatic RFID tuning procedure 500 stops (536).

One embodiment of automatic RFID tuning procedure 500 identifies all passive RFID tags such as RFID tags 131-139 during the RF signal measurement and mapping step. This embodiment allows for a verification after the tuning procedure to ensure all passive RFID tags are read by RFID transceiver 150.

One embodiment of automatic RFID tuning procedure 500 and automatic RFID Tuner 200 does not use a centralized computer 220 to manage the tuning procedure, but rather each RFID repeater, such as first RFID repeater 251 and second RFID repeater 252 follows its own pre-programmed search routine and communicates directly with other RFID repeaters during the search and voting procedure.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A process for automatically determining the placement of RFID repeaters for reading passive RFID tags in a dense packaging, the process comprising:
    moving an RFID repeater along a track through the dense packaging;
    measuring a RF signal from a RFID transceiver with the RFID repeater;
    identifying a dead spot in the dense packaging;
    determining a location to place the RFID repeater to ensure the RF signal reaches all passive RFID tags in the dead spot;
    moving the RFID repeater to the location; and
    reading all passive RFID tags located in the dead spot.

2. The process of claim 1 wherein a telescoping mast moves the RFID repeater in a vertical direction.

3. The process of claim 1 wherein a motorized carriage on a track moves the RFID repeater in a horizontal direction.

4. The process of claim 1 wherein a robotic arm moves the RFID repeater within the dense packaging.

5. The process of claim 1 wherein a computer manages the process.

6. The process of claim 1 further comprising:
    identifying all passive RFID tags located throughout the dense packaging while measuring the RF signal from the RFID transceiver.

7. The process of claim 6 further comprising:
    verifying that all identified passive RFID tags located throughout the dense packaging are read by the RFID transceiver.

8. An apparatus for automatically determining the placement of an RFID repeater to read passive RFID tags located in a dead spot in a dense packaging, the apparatus comprising:
    a RFID transceiver;
    a plurality of passive RFID tags positioned in the dense packaging and near the RFID transceiver;
    a means for moving the RFID repeater along the x, y and z axes within the dense packaging;
    a computer with a processor and a memory in communication with the RFID repeater and a motor means; and
    an automatic RFID tuning program in the memory operable to direct the motor means to move the RFID repeater through a predefined search routine within the dense packaging, record a RF signal from the RFID transceiver measured by the RFID repeater at positions within the dense packaging, calculate a position for the RFID repeater to ensure the RF signal reaches all passive RFID tags in the dense packaging, and direct the motor means to move the RFID repeater to the calculated position.

9. The apparatus of claim 8 wherein the motor means for moving the RFID repeater comprises a telescoping mast.

10. The apparatus of claim 8 wherein the motor means for moving the RFID repeater comprises motorized carriages on a track.

11. The apparatus of claim 8 wherein the motor means for moving the RFID repeater comprises a robotic arm.

12. The apparatus of claim 8 wherein the computer is integral with the RFID repeater.

13. The apparatus of claim 8 wherein the automatic RFID tuning program in the memory is further operable to identify all passive RFID tags located throughout the dense packaging while measuring the RF signal strength from the RFID transceiver.

14. The apparatus of claim 13 wherein the automatic RFID tuning program in the memory is further operable to verify that all identified passive RFID tags located throughout the dense packaging are read by the RFID transceiver.

15. A computer program product for automatically determining the optimal placement of a RFID repeater for reading passive RFID tags in a dense packaging, the computer program product comprising a computer-useable medium having a computer-readable program, wherein the computer-readable program when executed on a computer causes the computer to:

direct a mechanical means to move the RFID repeater through a predefined search routine along the x, y and z axes within the dense packaging;

record a RF signal from a RFID transceiver measured by the RFID repeater at positions within the dense packaging;

calculate a position for the RFID repeater to ensure the RF signal reaches all passive RFID tags in the packaging; and direct the mechanical means to move the RFID repeater to the calculated position.

16. The computer program product of claim 15 wherein the computer is integral with the RFID repeater.

17. The computer program product of claim 15 wherein the computer-readable program when executed on a computer causes the computer to identify all passive RFID tags located throughout the dense packaging while measuring the RF signal strength from the RFID transceiver.

18. The apparatus of claim 17 wherein the computer-readable program when executed on a computer causes the computer to verify that all identified passive RFID tags located throughout the dense packaging are read by the RFID transceiver.

* * * * *